3,686,270
PROCESS FOR THE HYDRODIMERIZATION OF ACRYLIC ACID DERIVATIVES
Yael Arad, Tel Aviv, and Moshe Levy and David Vofsi, Rehovoth, Israel, assignors to UCB (Union Chimique-Chemische Bedrijven) S.A., Saint-Gilles-lez-Brussels, Belgium
No Drawing. Continuation of abandoned application Ser. No. 711,853, Mar. 11, 1968. This application Nov. 9, 1970, Ser. No. 88,228
Claims priority, application Israel, Nov. 16, 1967, 28,953
Int. Cl. C07c 121/26
U.S. Cl. 260—465.8 A                4 Claims

ABSTRACT OF THE DISCLOSURE

In a process for the hydrodimerization of acrylonitrile to produce adiponitrile by contacting acrylonitrile with an alkali metal amalgam, the improvement which comprises carrying out said hydrodimerization in a medium consisting essentially of adiponitrile or propionitrile, the amounts used being 5 to 30% by weight of acrylonitrile, 5 to 50% by weight of water, and 0.001 to 5% by weight of a free quaternary ammonium base, the degree of alkalinity being at least that generated by the decomposition of the amalgam in the course of the reaction, thereby recovering alkali metal hydroxide and said adiponitrile.

---

This application is a continuation of Ser. No. 711,853, filed Mar. 11, 1968, now abandoned.

This invention relates to the hydrodimerization of acrylic acid derivatives and is a modification of the invention claimed in the copending U.S. patent application Ser. No. 702,821, filed Feb. 5, 1968 (hereinafter called the "main invention").

The main invention consists in a process for the hydrodimerization of acrylic acid derivatives by reaction with an alkali metal amalgam in a non-polar, at least partially water-miscible solvent medium containing a free quaternary ammonium base and water, the process being performed without pH control at the degree of alkalinity generated by the reaction. In connection with the main invention the term "acrylic acid derivatives" means acrylonitrile, lower-alkyl acrylonitriles as well as lower-alkyl acrylic acid esters and amides.

According to the present invention the hydrodimerization is carried out in a solvent medium consisting of at least one organic nitrile substantially immiscible in water and containing a free quaternary ammonium base and water, the process being performed without pH control.

Suitable nitriles are, for example, adiponitrile, butyronitrile and propionitrile.

Where adiponitrile is the solvent medium the invention offers a very considerable technical advantage as adiponitrile is the product of the reaction and no extraneous solvent need be used. The reaction medium itself can be recycled for use in subsequent reactions. This also has the additional advantage of avoiding the necessity of separating and distilling solvents. Moreover, the invention avoids the possibility of formation of undesired by-products which could be formed by extraneous solvents and may be difficult to separate from the dimer constituting the desired final products.

The quaternary ammonium bases used in the process of this invention are the same as in the main invention, i.e. those of the formula $R_1R_2R_3R_4NOH$ where $R_1$, $R_2$, $R_3$ and $R_4$ are the same or different alkyl, cycloalkyl, aryl or aralkyl radicals. As a rule the quaternary ammonium base is used in a concentration of 0.001 to 5%, preferably 0.01 to 0.5%, by weight of the reaction mixture. The water is present in the reaction mixture preferably in an amount of 5 to 50% by weight of the mixture, and the concentration of the acrylic derivative is preferably between 5% and 30% by weight. It has also been found advantageous that some sodium hydroxide be present in the reaction medium from the beginning. This is also a product of the reaction and does not constitute an extraneous additive.

The invention is illustrated by the following examples to which it is not limited.

EXAMPLE 1

10 g. of acrylonitrile, 50 g. of adiponitrile, 25 g. of water, 2 g. of sodium hydroxide and 0.2 g. of a 40% by weight aqueous solution of trimethyl benzyl ammonium hydroxide were introduced into a reaction flask containing 2 kg. of sodium amalgam (containing 0.3% by weight of sodium). The reaction mixture was stirred mechanically for 5 minutes in an ice bath. The depleted amalgam was separated from the reaction mixture. The aqueous phase containing the sodium hydroxide was also separated and the sodium hydroxide recovered. The organic phase was distilled under normal pressure, the distillate being 1.2 g. of propionitrile, and then under reduced pressure whereby 58.3 g. of adiponitrile (B.P. 180–182° C.) were obtained as a distillate. This was a yield of 83% of adiponitrile and 12% of propionitrile, calculated on the reacted acrylonitrile. The metal conversion yield was 90%.

EXAMPLE 2

1.5 kg. of sodium amalgam (sodium concentration 0.3% by weight) were introduced into a flask equipped with a mechanical stirrer, and cooled in an ice bath. A mixture of 10 g. of adiponitrile, 14 g. of water, 2 g. of sodium hydroxide and 0.3 g. of a 40% by weight aqueous solution of trimethyl benzyl ammonium hydroxide was added to the amalgam. The mixture was stirred and 10 g. of acrylonitrile were slowly introduced from a burette in the course of 10 minutes. The amalgam and the aqueous phase were separated and the organic phase was subjected to distillation as in Example 1. The products consisted of 0.6 g. of propionitrile and 18.5 g. of adiponitrile. This amounted to an 85% yield of adiponitrile and a 6% yield of propionitrile. The sodium conversion yield was 95%.

EXAMPLE 3

10 g. of acrylonitrile, 50 g. of propionitrile, 25 g. of water, 2 g. of sodium hydroxide and 0.1 g. of a 40% aqueous solution of trimethyl benzyl ammonium hydroxide were added to 2 kg. sodium amalgam and reacted as described in Example 1. The products were distilled as in Example 1 and consisted of 51 g. of propionitrile and 8.3 g. of adiponitrile. This amounted to an 83% yield of adiponitrile and a 10% yield of propionitrile. The sodium conversion yield was 90%.

EXAMPLE 4

10 g. of acrylonitrile, 50 g. of adiponitrile, 25 g. of water, 2 g. of sodium hydroxide and 0.5 g. of a 40% aqueous solution of tetraethyl ammonium hydroxide were reacted with sodium amalgam as described in Example 1. The products of the reaction were a 78% yield of adiponitrile and a 15% yield of propionitrile. The metal conversion yield was 90%.

EXAMPLE 5

10 g. of acrylonitrile, 50 g. of adiponitrile, 25 g. of water, 2 g. of sodium hydroxide and 0.4 g. of a 40% aqueous solution of trimethyl cetyl ammonium hydroxide were reacted with sodium amalgam as described in Example 1. The products of the reaction were an 85% yield of adiponitrile and a 10% yield of propionitrile. The metal conversion yield was 93%.

EXAMPLE 6

10 g. of acrylonitrile, 50 g. of adiponitrile, 25 g. of water, 2 g. of sodium hydroxide and 0.3 g. of a 40% aqueous solution of trimethyl phenyl ammonium hydroxide were reacted with sodium amalgam as described in Example 1. The products of the reaction were an 83% yield of adiponitrile and a 10% yield of propionitrile. The metal conversion yield was 90%.

What is claimed is:

1. In a process for the hydrodimerization of acrylonitrile to produce adiponitrile by contacting an alkali metal amalgam with a liquid hydrodimerization medium containing said acrylonitrile and water, the improvement which comprises that said hydrodimerization medium is a mixture of acrylonitrile, water, a free quaternary ammonium base of the formula $R_1R_2R_3R_4NOH$ wherein $R_1$, $R_2$ and $R_3$ each represent lower alkyl and $R_4$ is a member selected from the group consisting of alkyl having from 1 to 16 carbon atoms, phenyl and benzyl, with a substantially water-immiscible medium consisting essentially of adiponitrile or propionitrile, in which mixture the proportion of acrylontrile is of from 5 to 30% by weight, the proportion of water of from 5 to 50% by weight, the proportion of free quaternary ammonium base of from 0.001 to 5% by weight, the balance consisting essentially of adiponitrile or propionitrile, the dimerization being carried out at the degree of alkalinity which corresponds to that generated by the decomposition of the amalgam in the course of the reaction, whereby alkali metal hydroxide is recovered from the aqueous phase and adiponitrile from the organic phase of said mixture upon completion of the reaction.

2. The process according to claim 1, wherein the reaction medium is maintained at a temperature of about 0° C.

3. The process according to claim 1, in which the free quaternary ammonium base is trimethyl benzyl ammonium hydroxide.

4. The process according to claim 1, in which the free quaternary ammonium base is used in a proportion of 0.01 to 0.2% by weight of the reaction medium.

References Cited
UNITED STATES PATENTS 3,534,078   10/1970   Woodhall et al. __ 260—465.8 AX
3,591,622   7/1971    Woodhall _____ 260—465.8 A
3,356,708   12/1967   Davies et al. ____ 260—465.8 A JOSEPH P. BRUST, Primary Examiner